(12) United States Patent
Nakagoe et al.

(10) Patent No.: US 10,484,276 B2
(45) Date of Patent: Nov. 19, 2019

(54) ROUTE RESOLUTION SYSTEM AND ROUTE RESOLUTION METHOD

(71) Applicant: HITACHI, LTD., Tokyo (JP)

(72) Inventors: Hiroshi Nakagoe, Tokyo (JP); Takatoshi Kato, Tokyo (JP)

(73) Assignee: HITACHI, LTD., Tokyo (JP)

( * ) Notice: Subject to any disclaimer, the term of this patent is extended or adjusted under 35 U.S.C. 154(b) by 248 days.

(21) Appl. No.: 15/500,113

(22) PCT Filed: Aug. 1, 2014

(86) PCT No.: PCT/JP2014/070299
§ 371 (c)(1),
(2) Date: Jan. 30, 2017

(87) PCT Pub. No.: WO2016/017021
PCT Pub. Date: Feb. 4, 2016

(65) Prior Publication Data
US 2017/0264541 A1    Sep. 14, 2017

(51) Int. Cl.
*G06F 15/173* (2006.01)
*H04L 12/721* (2013.01)
(Continued)

(52) U.S. Cl.
CPC .......... *H04L 45/70* (2013.01); *H04L 41/0853* (2013.01); *H04L 43/08* (2013.01);
(Continued)

(58) Field of Classification Search
CPC ..... H04L 41/0853; H04L 41/12; H04L 43/08; H04L 45/04; H04L 45/42; H04L 45/70; H04L 61/1511; H04L 67/10
(Continued)

(56) References Cited

U.S. PATENT DOCUMENTS 8,385,336 B2 * 2/2013 Fujiwara ................. H04B 3/54
370/389
9,654,415 B2 * 5/2017 Kato ....................... H04L 47/76
(Continued)

FOREIGN PATENT DOCUMENTS

| JP | 2010-503901 A | 2/2010 |
|---|---|---|
| WO | 2010/044210 A1 | 4/2010 |
| WO | 2013/157042 A1 | 10/2013 |

*Primary Examiner* — Liang Che A Wang
(74) *Attorney, Agent, or Firm* — Volpe and Koenig, P.C.

(57) ABSTRACT

A service performance, such as a responsiveness and throughput, is improved in a distributed system including system components distributed over a plurality of regions. A route resolution system, is coupled to a distributed system including a plurality of components which configure the system and which are distributed over a plurality of regions, converts a measured value of a processing performance between the components into a standard value independent from network performance information, derives, upon receiving a route inquiry request from a component to which a request from a client terminal has been forwarded, a plurality of routes being coupled the plurality of the components for processing the request, calculates an estimated value of performance information required for processing the request, for each of the plurality of routes based on the standard value of the same request, and determines an optimal route based on the calculated estimated value.

8 Claims, 13 Drawing Sheets

(51) Int. Cl.
*H04L 29/08* (2006.01)
*H04L 12/715* (2013.01)
*H04L 12/717* (2013.01)
*H04L 12/24* (2006.01)
*H04L 12/26* (2006.01)
*H04L 29/12* (2006.01)

(52) U.S. Cl.
CPC .............. *H04L 45/04* (2013.01); *H04L 45/42* (2013.01); *H04L 67/10* (2013.01); *H04L 41/12* (2013.01); *H04L 61/1511* (2013.01)

(58) Field of Classification Search
USPC ................................ 709/201, 223, 238, 241
See application file for complete search history.

(56) References Cited

U.S. PATENT DOCUMENTS

| | | | |
|---|---|---|---|
| 9,769,238 B2 * | 9/2017 | Ludin | ................. H04L 61/1511 |
| 2008/0155061 A1 | 6/2008 | Afergan et al. | |
| 2009/0067015 A1 * | 3/2009 | Sasaki | ..................... H04N 1/40 358/505 |

* cited by examiner

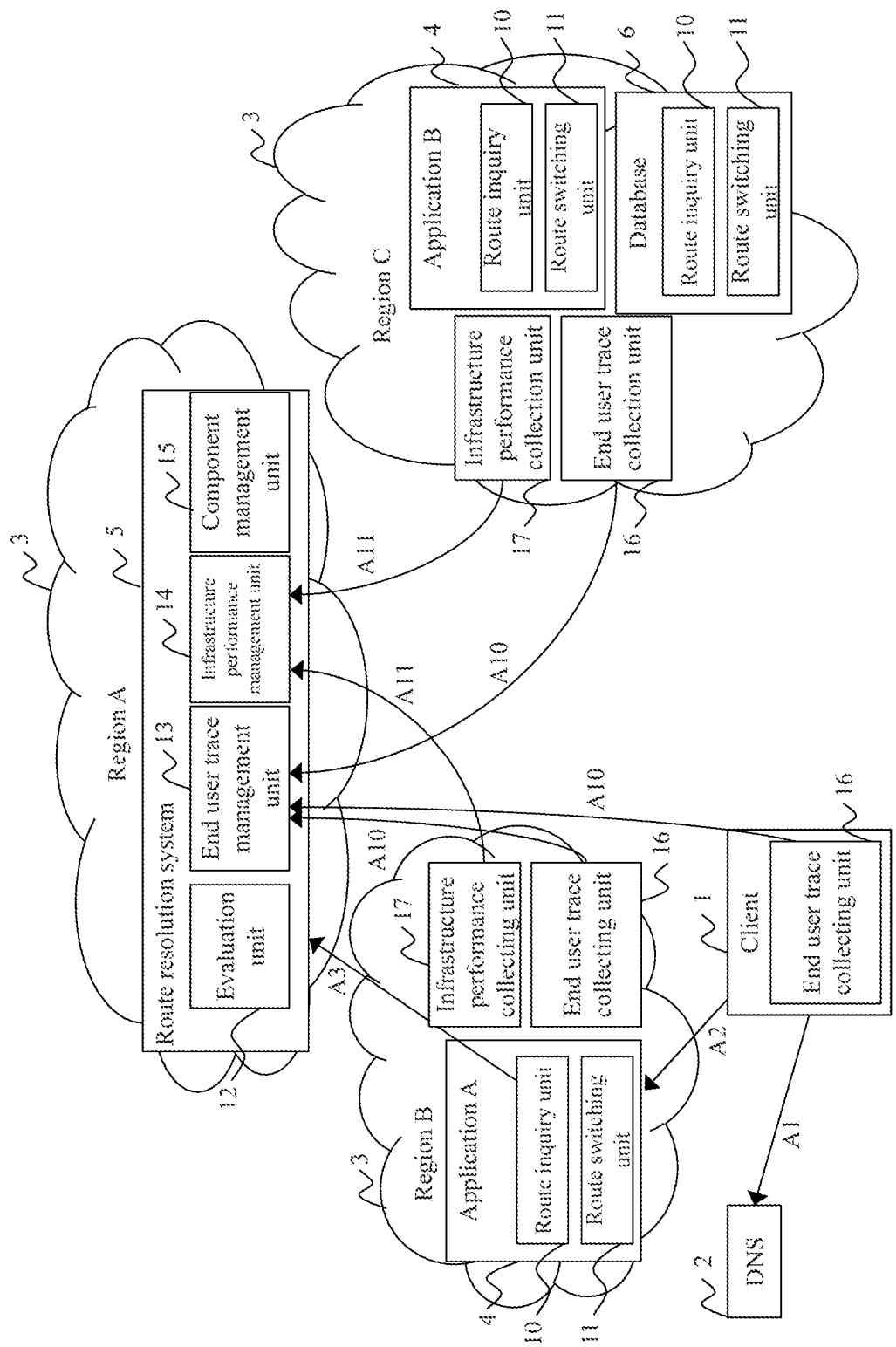
[Fig. 1]

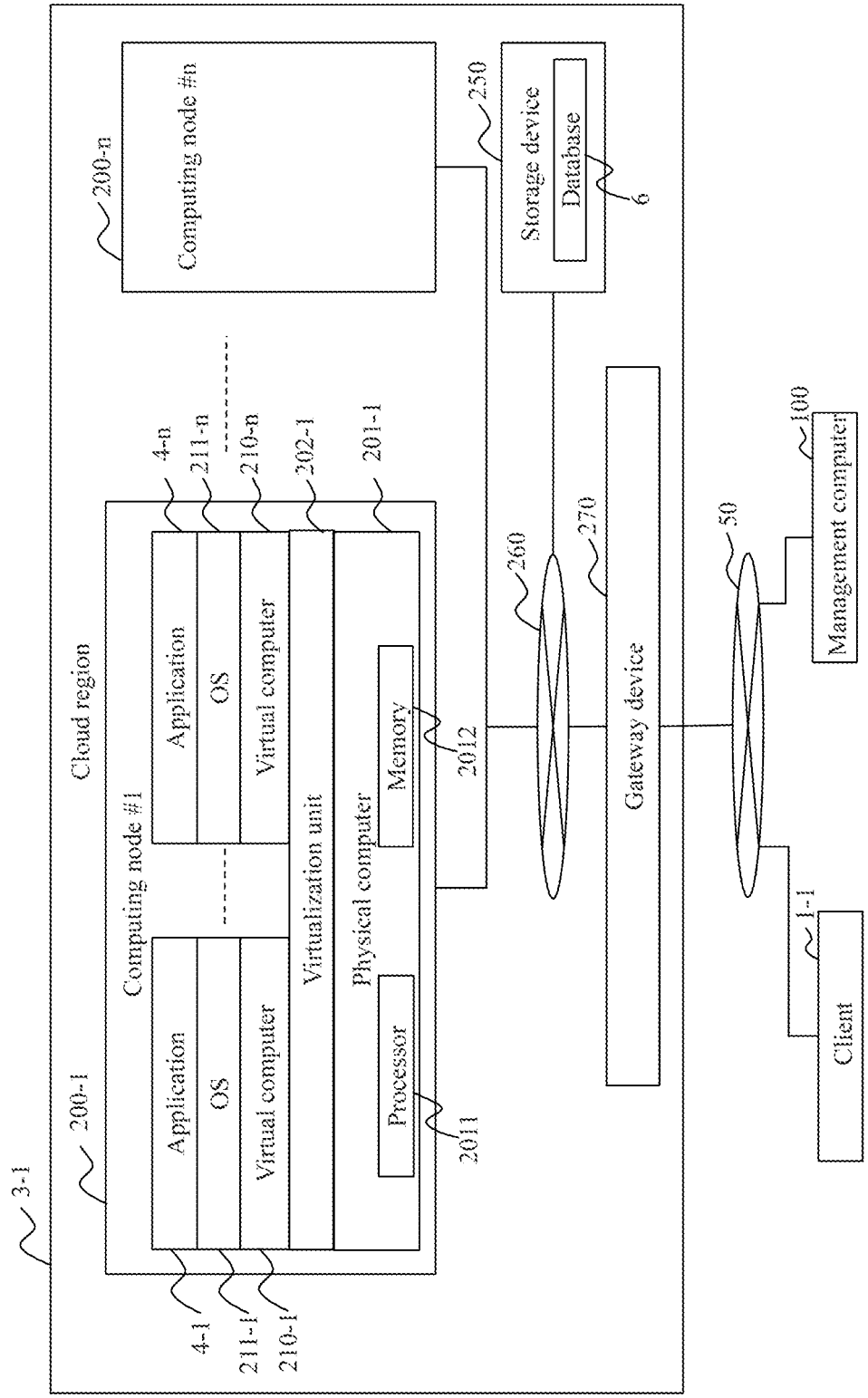

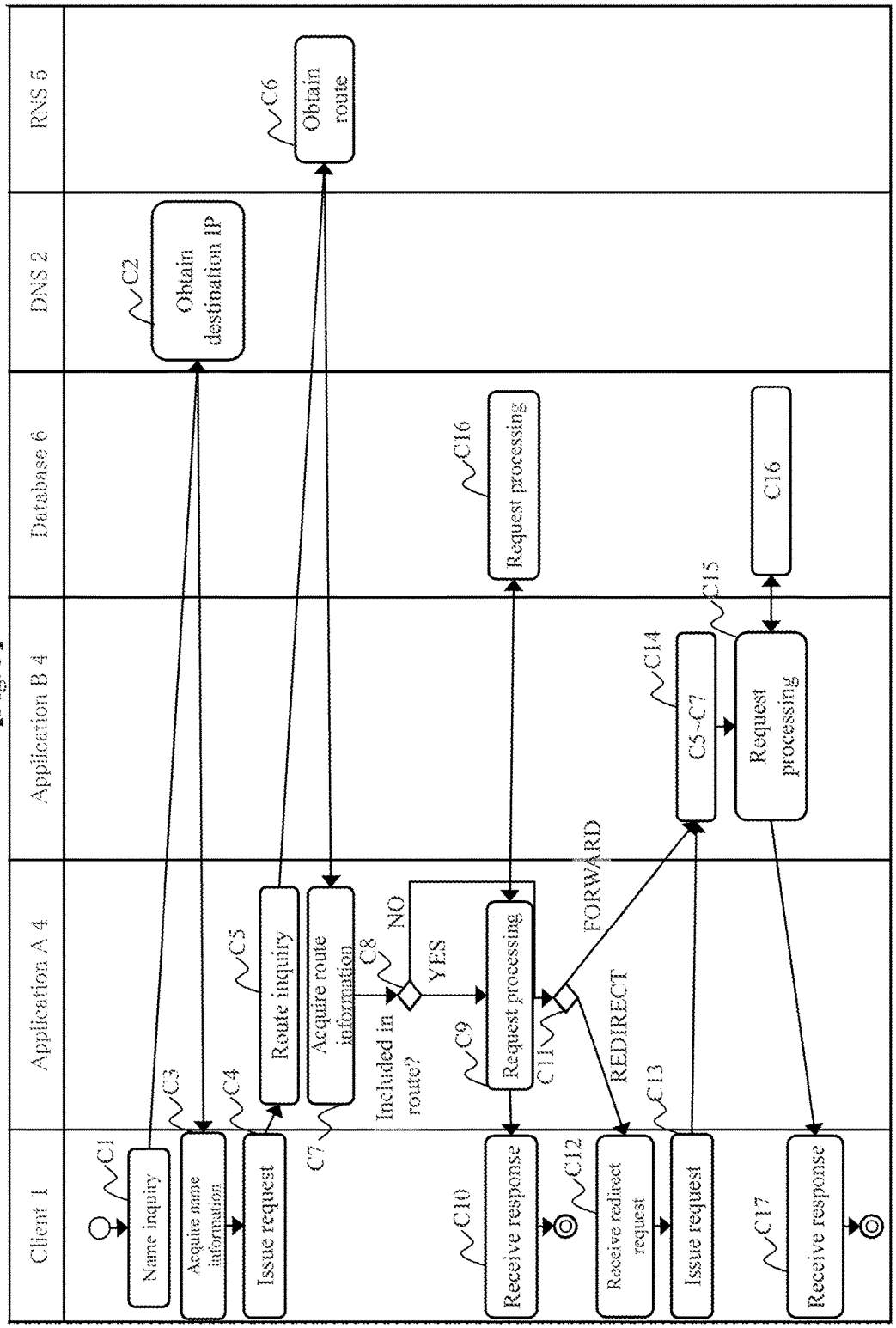
[Fig. 3]

[Fig. 4]
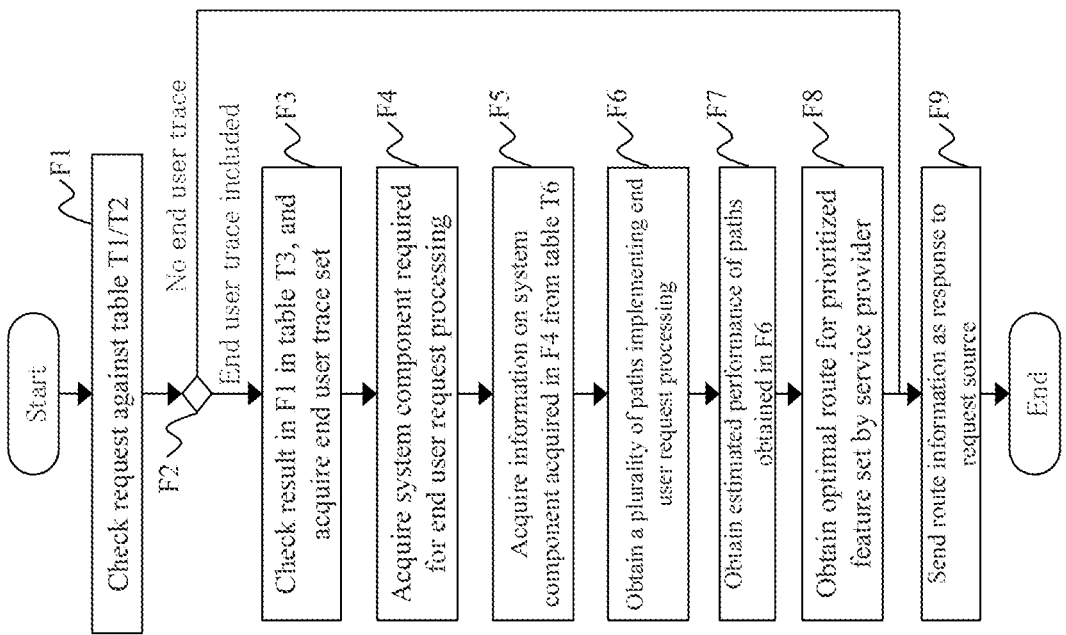

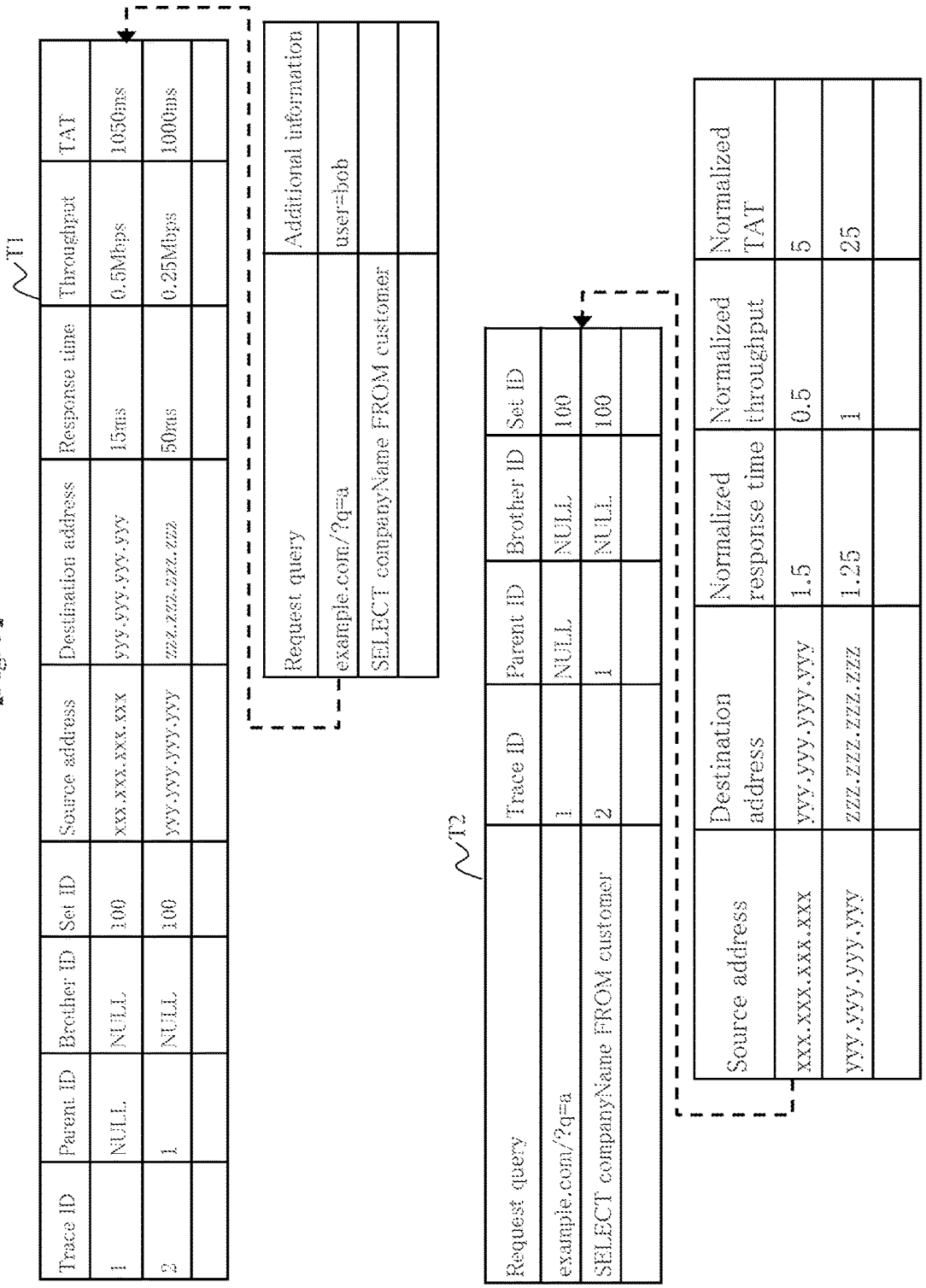
[Fig. 5]

| Set ID | Parent ID | Trace set |
|---|---|---|
| 100 | NULL | {1,2} |

T5

| ID | Network | Response time | Throughput | Hop count |
|---|---|---|---|---|
| 1 | {1,2} | 10ms | 1Mbps | 2 |
| 2 | {2,4} | 40ms | 0.25Mbps | 20 |
| 3 | {1,3} | 100ms | 0.1Mbps | 20 |
| 4 | {3,4} | 2ms | 50Mbps | 1 |
| 5 | {2,3} | 40ms | 0.25Mbps | 20 |

T4

| NetworkGID | Address range |
|---|---|
| 1 | [xxx.xxx.xxx.xxx, x'x'x'.x'x'x'.x'x'x'.x'x'x'] |
| 2 | [yyy.yyy.yyy.yyy, y'y'y'.y'y'y'.y'y'y'.y'y'y'] |
| 3 | [sss.sss.sss.sss, s's's'.s's's'.s's's'.s's's'] |
| 4 | [zzz.zzz.zzz.zzz, z'z'z'.z'z'z'.z'z'z'.z'z'z'] |

T6

| System component address | Location | Component type | Instance set | Performance index |
|---|---|---|---|---|
| yyy.yyy.yyy.yyy | Tokyo | Application | small × 2 | 2 |
| zzz.zzz.zzz.zzz | Virginia | Database | large × 2 | 4 |
| sss.sss.sss.sss | Virginia | Application | small × 2 | 2 |

[Fig. 7]

| Route candidate | Client-> Application | | | Application -> Database | | | Overall total (average) | | |
|---|---|---|---|---|---|---|---|---|---|
| | Response time | Throughput | TAT | Response time | Throughput | TAT | Response time | Throughput | TAT |
| Client-> Application A-> Database | 15ms | 0.5Mbps | 50ms | 50ms | 0.25Mbps | 1000ms | 65ms | 0.375Mbps | 1050ms |
| Client-> Application B-> Database | 165ms | 0.01Mbps | 515ms | 2.5ms | 50Mbps | 50ms | 165.5ms | 25Mbps | 565ms |
| Client-> Application A-> Application B-> Database | 75ms | 0.375Mbps | 250ms | 2.5ms | 50Mbps | 50ms | 77.5ms | 25.188Mbps | 300ms |

~VT1

R1:
```
route:[
  {
    ip: sss.sss.sss.sss,
    current: true,
    switch: forward
  },
  {
    ip: zzz.zzz.zzz.zzz,
    current: false,
    switch: null
  }
]
```

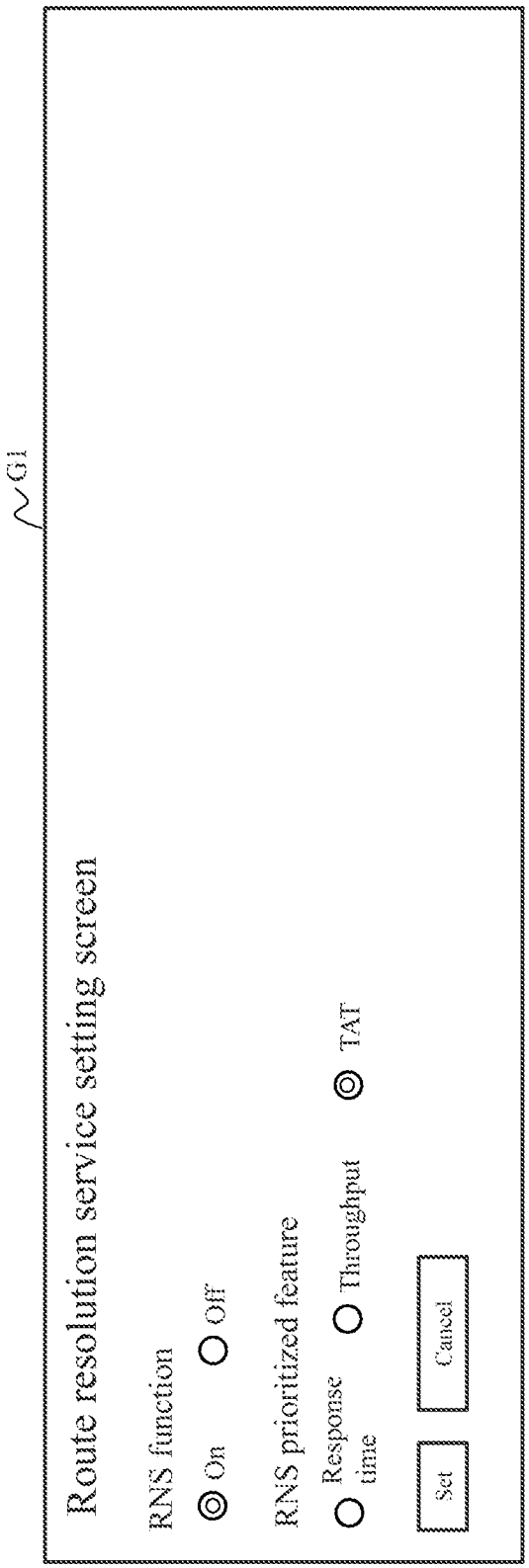

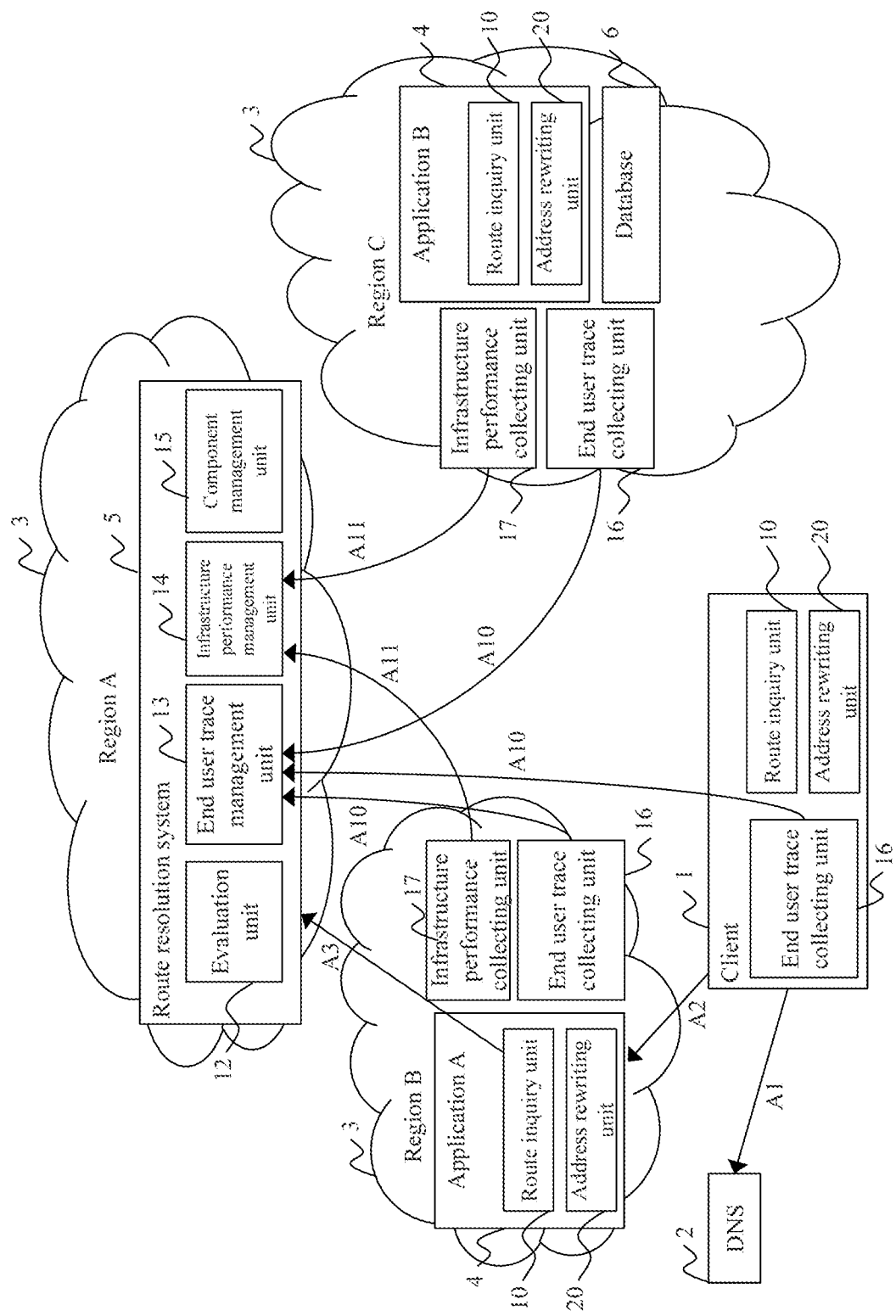

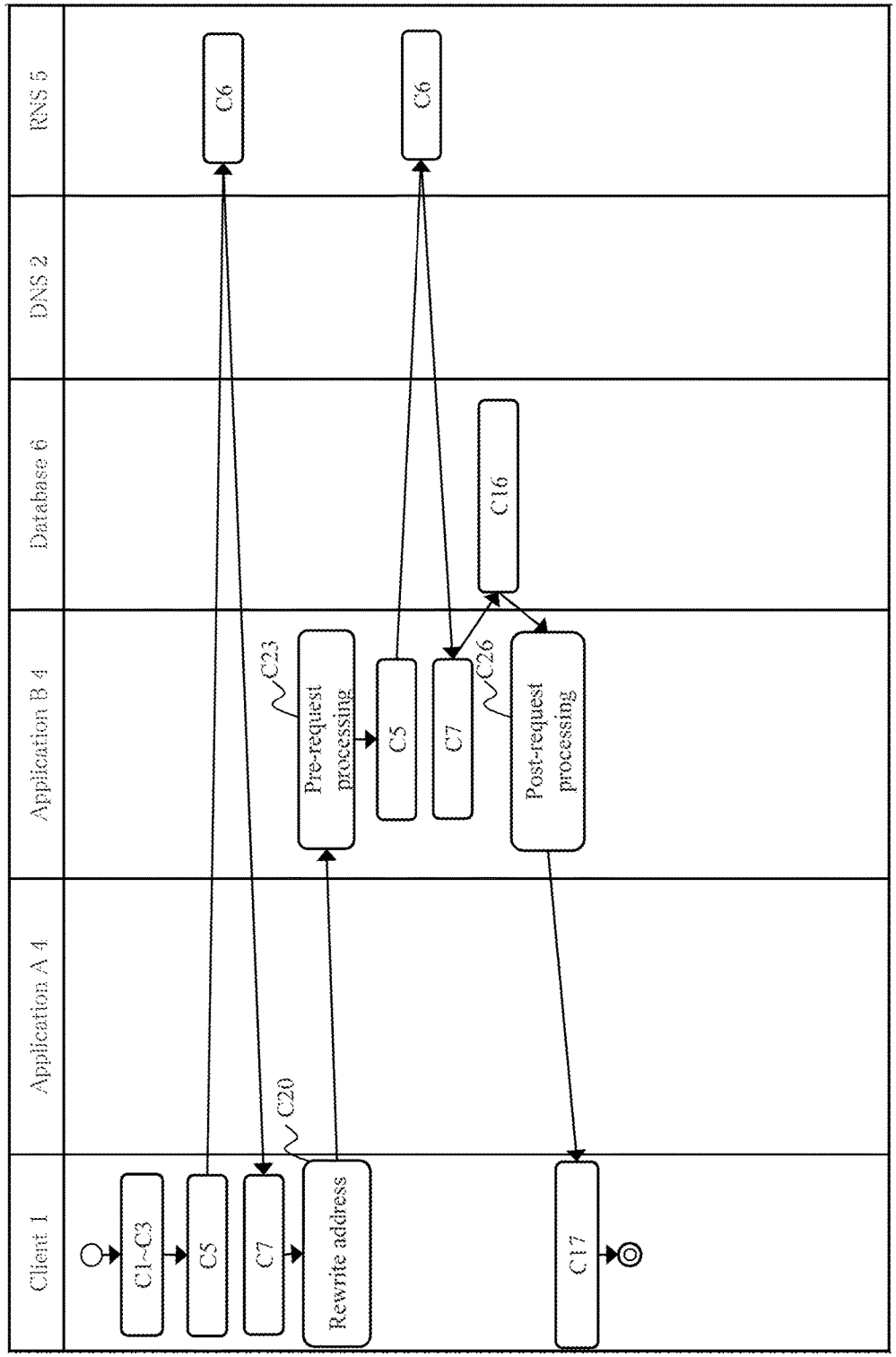

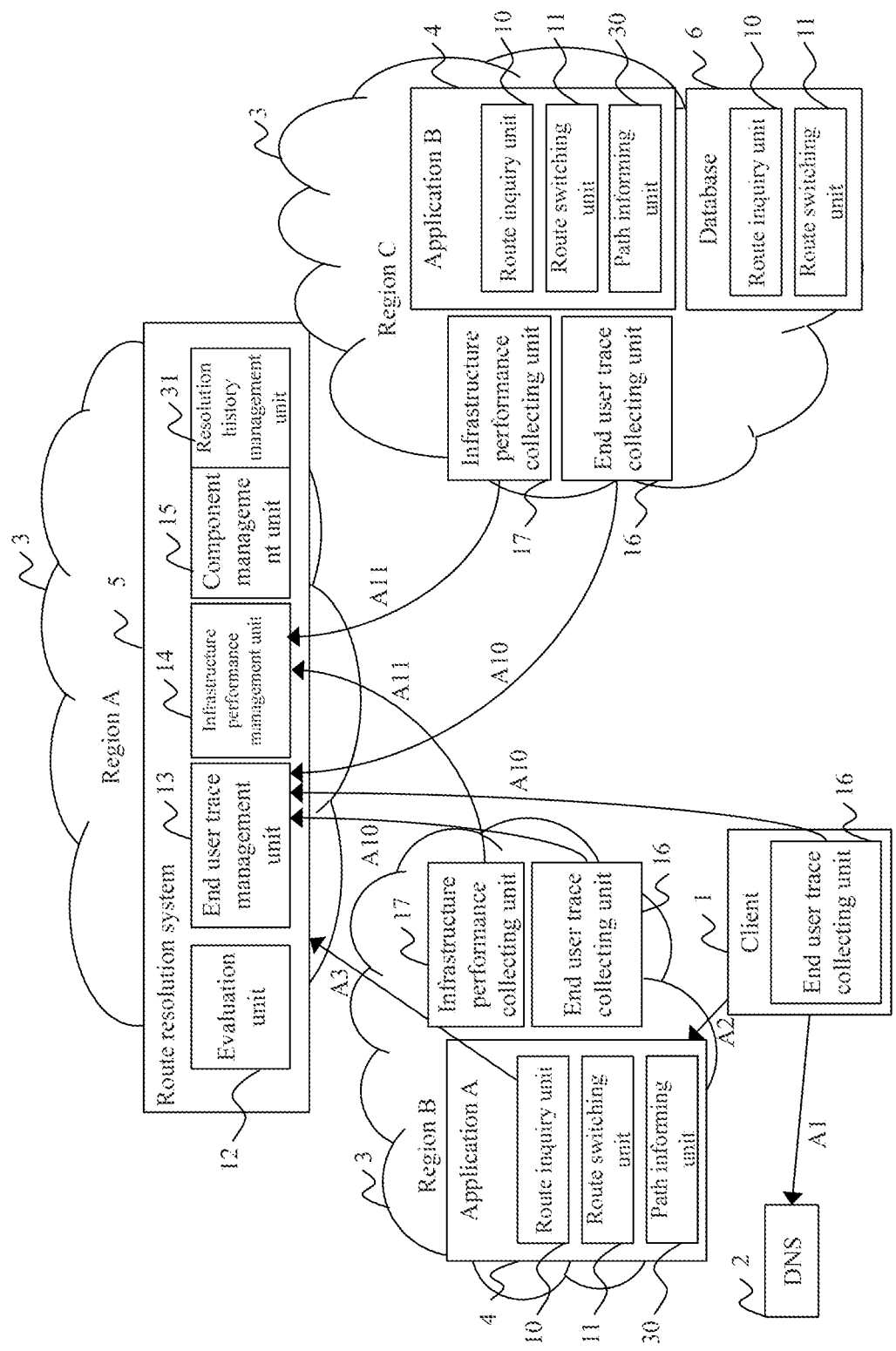
[Fig. 11]

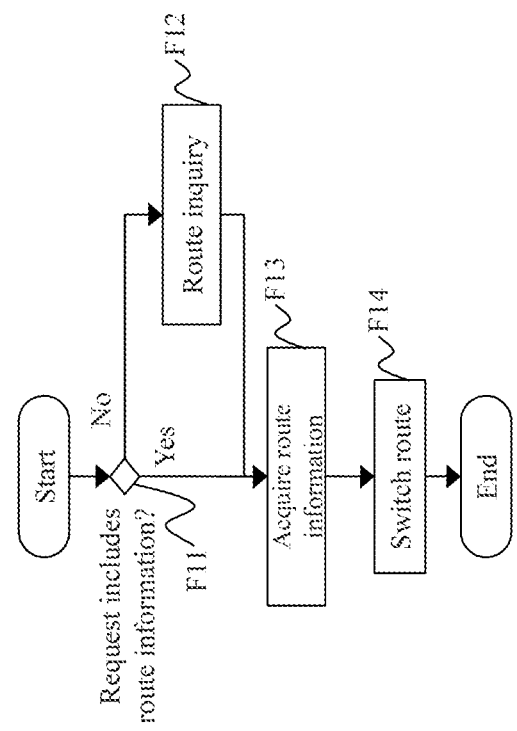

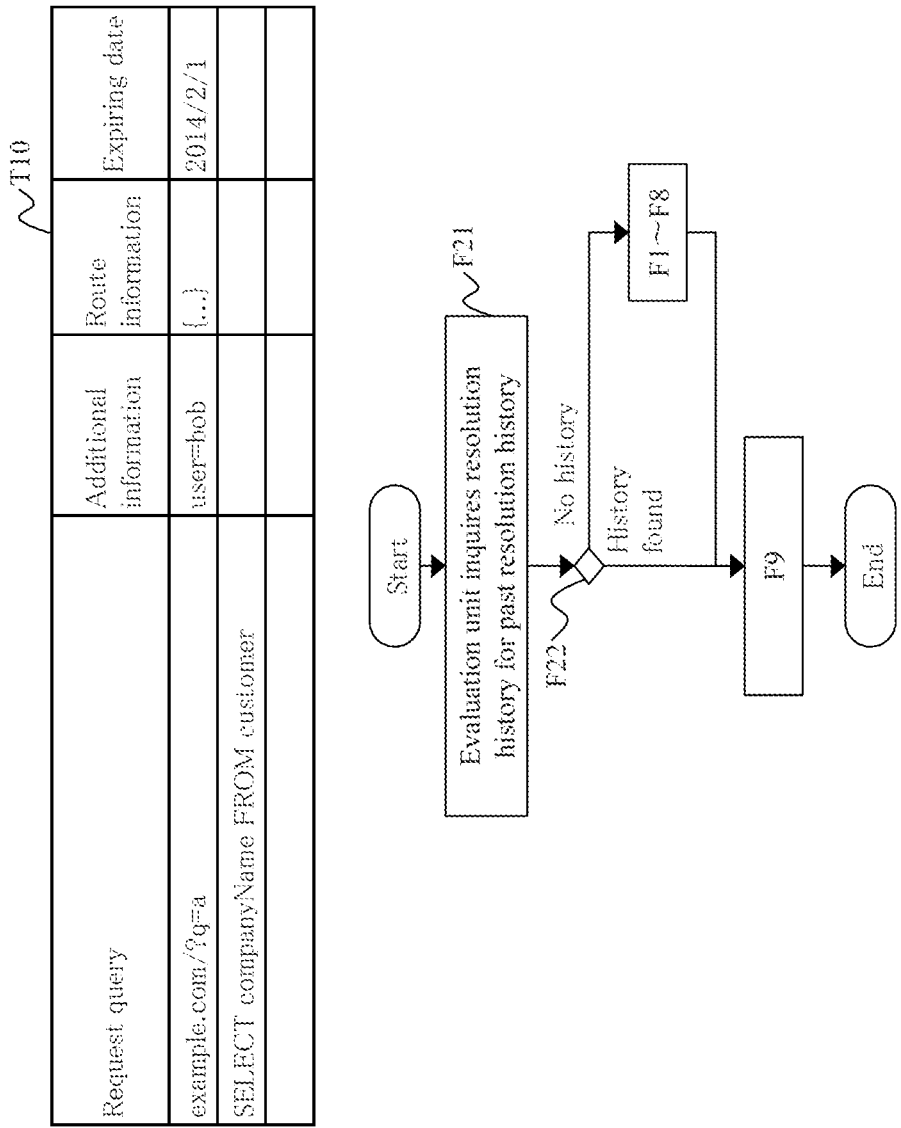

ROUTE RESOLUTION SYSTEM AND ROUTE RESOLUTION METHOD

TECHNICAL FIELD

The present invention relates to optimizing a route connecting system components in a distrusted system established over a plurality of regions.

BACKGROUND ART

Cloud computing services providing an information technology has been widely used. A cloud computing service provider (hereinafter, referred to as a cloud provider), providing the cloud computing service, has been building data centers on a worldwide scale for various objectives including providing high responsiveness, high throughput, and short turnaround time (TAT) for end users all over the world.

In this circumstance, an application service provider (hereinafter, referred to as an application provider), using the cloud computing service, is required to provide an application with high responsiveness, high throughput, and short TAT to end users.

PTL 1 discloses a technique of establishing a connection between an end user and an application in a data center close to the end user, to provide high responsiveness, high throughput, and short TAT for the end user.

CITATION LIST

Patent Literature

[PTL 1]
Japanese Translation of PCT Application No. 2010-503901

SUMMARY OF INVENTION

Technical Problem

The technique disclosed in PTL 1 only applies to a case where an application system is not distributed over a plurality of regions. Thus, the responsiveness, the throughput, and the TAT might be compromised in a system (hereinafter, referred to as a distributed system) including components distributed over a plurality of regions. The components include an application and application data of the application system. The region includes a single data center or a plurality of data centers in close locations. The responsiveness, the throughput, the TAT, etc., used for evaluating the performance of the application service, are hereinafter collectively referred to as a service performance.

In actual situations, the system components are not necessarily located close to the end user, due to limitations such as operating costs as well as laws and regulations in each country. In a three-tier model layer system, generally employed in a cloud system, components corresponding to a presentation layer and an application layer may be located in a region close to the end user; and a component corresponding to a data layer may be located in a region in a different country far from the end user; thus, the data transmission between the application layer and the data layer takes place between different regions. Generally, a longer distance leads to a lower data transmission performance. Thus, the long-distance transmission of a large amount of data, as described above, leads to the degradation of the performance of the system as a whole.

Multiple components corresponding to the presentation layer, the application layer, and the like in the cloud system are likely to be provided for load balancing. In such a case, the service performance for the end user largely depends on how a route, including components for processing an end user request, is selected. For example, an end user request involving no access to the data layer may be processed in a configuration where the data layer is disposed far from the end user. In such a case, the connection destination of the end user is preferably the presentation layer or the application layer, which is close to the end user. On the other hand, for a request from an end user that frequently accesses the data layer at a remote location and has the result often processed in the application layer, an application layer at the remote location is preferably selected for processing the request.

Solution to Problem

In view of the above, a route resolution system and a route resolution method according to the present invention features determination of a route between system components with which a high service performance can be provided regarding the entire end user processing, in a distributed system including system components distributed over a plurality of regions.

Specifically, a route resolution system for a distributed system includes: a component management unit that manages configuration information including addresses and types of a plurality of components configuring the distributed system; an infrastructure performance management unit that manages network performance information including a measured value of performance information on a network of the plurality of components; an end user trace management unit that manages processing performance information including a total value of the measured value of the performance information between the plurality of components required for processing executed for each request from a client terminal as one of the plurality of components; an evaluation unit that converts, based on the configuration information, the network performance information, and the processing performance information, the measured value of the processing performance information into a standard value independent from the network performance information, derivers, upon receiving a route inquiry request from the component to which the request has been forwarded, a plurality of routes connecting the plurality of the components for processing the request, based on the configuration information, identifies the standard value obtained for the request in combination of the same type of adjacent components in the plurality of routes, calculates an estimated value of performance information required for processing the request, for each of the plurality of routes, based on the identified standard value and the network performance information, and determines an optimal route based on the calculated estimated value.

A route resolution method for a distributed system according to the present invention includes: managing configuration information including addresses and types of a plurality of components configuring the distributed system; managing network performance information including a measured value of performance information on a network of the plurality of components; managing processing performance information including a total value of the measured value of the performance information between the plurality of components required for processing executed for each request from a client terminal as one of the plurality of components;

converting, based on the configuration information, the network performance information, and the processing performance information, the measured value of the processing performance information into a standard value independent from the network performance information; deriving, upon receiving a route inquiry request from the component to which the request has been forwarded, a plurality of routes connecting the plurality of the components for processing the request, based on the configuration information; identifying the standard value obtained for the request in combination of the same type of adjacent components in the plurality of routes; calculating an estimated value of performance information required for processing the request, for each of the plurality of routes, based on the identified standard value and the network performance information; and determining an optimal route based on the calculated estimated value.

Advantageous Effects of Invention

The present invention can improve a service performance of a distributed system.

BRIEF DESCRIPTION OF DRAWINGS

FIG. 1 is a block diagram illustrating an example of a first embodiment of the present invention.

FIG. 2 is a diagram illustrating an example of a region according to the present invention.

FIG. 3 is a diagram illustrating communications among system components according to the first embodiment of the present invention.

FIG. 4 is a flowchart illustrating processing executed in a route resolution system.

FIG. 5 is a diagram illustrating an example of a table managed by an end user trace management unit.

FIG. 6 is a diagram illustrating examples of a table managed by the end user trace management unit, a table managed by an infrastructure performance management unit, and a table managed by a component management unit.

FIG. 7 is a diagram illustrating a list of service performances of a plurality of routes with which end user request can be processed, derived by an evaluation unit, and an example of a response from the route resolution system.

FIG. 8 is a diagram illustrating a setting screen for the route resolution system.

FIG. 9 is a block diagram illustrating an example of a second embodiment of the present invention.

FIG. 10 is a diagram illustrating an example of communications between system components according to the second embodiment of the present invention.

FIG. 11 is a block diagram illustrating an example of a third embodiment of the present invention.

FIG. 12 is a flowchart illustrating an example of route informing.

FIG. 13 is a diagram illustrating a table managed by a resolution history management unit.

Embodiments of the present invention are described below.

EXAMPLE 1

A first embodiment of the present invention is described below with reference to the drawings. Throughout the drawings, the same functions are denoted with the same reference numerals, and redundant description thereof is omitted.

FIG. 1 is a diagram illustrating a configuration of a route resolution unit according to one embodiment of the present invention. A client 1 utilizes a service provided by cloud computing. Here, the client 1 is defined as one of the components configuring a distributed system. A domain name system (DNS 2) performs name resolution upon receiving a request from a client or an application system. More specifically, the DNS 2 converts a fully qualified domain name (FQDN), transmitted from the client or the like, into an Internet protocol (IP) address. Regions A to C3 each includes a data center or a plurality of data centers in close locations for the cloud computing. The regions A to C3 are not limited to the cloud computing, and generally include any computing environment. The region A may be the same region as the region B or C. Applications A and B 4 correspond to a presentation layer and an application layer in an application system.

A route resolution system 5 resolves a combination of system components optimal for processing a request from an end user, that is, an optimal route, upon receiving an inquiry from the applications A and B 4. A database 6 corresponds to a data layer in the application system. A route inquiry unit 10 inquires with the route resolution system 5 about the optimal route. A route switching unit 11 switches a route based on route information transmitted from the route resolution system 5 as a response to be received by the route inquiry unit 10. An evaluation unit 12 uses information from an end user trace management unit 13, an infrastructure performance management unit 14, and a component management unit 15 to perform an evaluation to obtain a route optimal for a prioritized feature designated by an application provider, based on the content of the end user request transmitted from the route inquiry unit 10 and the location of the end user.

The end user trace management unit 13 manages an end user trace, collected by an end user trace collecting unit 16, including a history of how the end user has used an application and a database. The infrastructure performance management unit 14 manages a system performance of each region where the system components are disposed, collected by an infrastructure performance collecting unit 17. Specific examples of the system performance include a performance of a computing resource, a storage I/O performance, and a network performance. The component management unit 15 manages a system configuration including the location and the type of a system component, and performance specification of a computing resource provided with the system components.

These elements 1 to 17 are coupled to each other via a network. An inquiry A1 is issued to the DNS 2 by the client 1 when the name resolution is to be performed. A connection A2 is established with an application as a result of the name resolution. A route inquiry request A3 is issued by the route inquiry unit 10. An end user trace A10 is transmitted from the end user trace collecting unit 16 to the end user trace management unit 13. Infrastructure performance information A11 is transmitted from the infrastructure performance collecting unit 17 to the infrastructure performance management unit 14.

FIG. 2 is a block diagram illustrating an example of the region. Here, FIG. 2 illustrates a region including a single data center. A region including a plurality of data centers may be implemented by simply coupling a plurality of regions 3-1 illustrated in the figure with each other.

The region 3-1 includes: a plurality of computing nodes (#1 to #n) 200-1 to 200-n; a storage device 250; a gateway device 270; and a network 260 that couples these elements with each other. The nodes 200-1 to 200-n will be collectively referred to as a node 200. Each node 200 is coupled to an external network 50, via the network 260 and the gateway device 270 in the region, to be further coupled to the client 1 and a management computer 100.

The node (#1) 200-1 includes: a physical computer 201-1; a virtualization unit 202-1 that allocates one or more computer resources of the physical computer 201-1 to one or more virtual computers 210-1 to 210-n; and applications 4-1 to 4-n that run on operating systems (OSs) 211-1 to 211-n of the virtual computers 202-1 to 202-n. The OSs 211-1 to 211-n will be collectively referred to as an OS 211. Similarly, the applications 4-1 to 4-n will be collectively referred to as an application 4. The physical computer 201-1 includes a processor 2011 and a memory 2012.

The storage device 250 is configured to store therein the OS 211, the application 4 or the database 6 used by the application 4, and the like. In the region 3-1, one or more virtual computers 210 are generated, the OS 211 and the application 4 are executed, and the service of the application 4 is provided to the client, in accordance with an instruction from the management computer 100.

FIG. 3 is a diagram illustrating communications for resolving the route of the system components optimal for the content of the processing requested by the client 1, and for controlling connections among system components. FIG. 3 schematically illustrates an overview of the route resolution unit according to the present embodiment. Details thereof will be described in detail with reference to FIG. 4 to FIG. 7.

The client 1 needs to inquire with the DNS about an application service domain and acquire an IP address, to establish connection with the application service. Thus, the client 1 requests the DNS 2 for the name resolution (C1). The DNS 2 resolves the IP address of the requested domain (C2), and transmits a resolution result as a response to the client 1 as the connection source (C3). Here, the IP address obtainable from this response is the IP address of the application A 4. This is for the DNS 2 to monitor a response time between the end user and the application system and respond with the IP address of the application A 4 involving a shortest response time. This latency based name resolution is a most popular method employed in distributed systems. Besides the latency based name resolution, the DNS may employ a method including: a static name resolution method involving static response of an IP address; and a dynamic name resolution involving response of IP addresses of a plurality of applications based on round-robin or the like. Here, the application service is a distributed system for a main objective of improving service performance, and also for an objective such as achieving service continuity. The static name resolution method is effective for neither of the objectives, and the dynamic name resolution method is effective for the service continuity only. All things considered, the distributed system employs the latency based name resolution method.

Next, the client 1 issues a request to the application A 4 with the resolved IP address (C4). The route inquiry unit 10 of the application A 4 requests the route resolution system 5 (referred to as a route name system (RNS) in FIG. 3) for the route resolution (C5). The route resolution system 5 derives a route based on the end user request content in the request (C6), and transmits the route information as a response to the route inquiry unit 10 of the application A 4 that has issued the request (C7).

The route switching unit 11 of the application A 4 refers to the route information in C7 to check whether the route includes the application A 4 (C8). When the application A 4 is included or the route information is void, control is passed to the application A 4, and the processing of the application A 4 is executed (C9). When processing in the database 6 is required, a processing request is issued so that the database 6 executes the processing (C16). Then, the client 1 receives a response from the application A 4 (C10), and the processing is completed.

When the route does not include the application A 4 in C8, the route switching unit 11 issues a redirect request to the client 1 (C12) to request the client 1 for directly issuing a request again to the application B 4 (C13), or forwards the processing to the application B 4, in accordance with a switching mode in the route information.

The route inquiry unit 10 is only in charge of issuing an inquiry to the route resolution system 5, and thus can be easily implemented by a developer of an application provider, to be provided as a library of a function, method, class, object, or the like representing the processing of the route inquiry unit 10. The route switching unit 11 is only in charge of referring to the route information received by the route inquiry unit 10, determining whether the processing is executed by the application including the route switching unit 11 or by another application, and determining one of redirecting and forwarding when the processing is to be executed by the other application. Thus, the developer of the application provider can easily implement the route switching unit 11 to be provided as a library provided as in the case of the route inquiry unit 10 described above. The route inquiry unit 10 and the route switching unit 11 with the functions according to the present embodiment can be utilized, with only few rows inserted at the head of the application, excluding processing of reading the library and the like.

Regarding the implementation of the functions, the system components such as the applications A and B 4 and the database 6 may not be in a modifiable format such as source code, and may be in an unmodifiable format such as binary. In such a case, the functions can be implemented with a reverse proxy for the route resolution prepared in the same region as the system components such as the applications A and B 4, the database 6, and the like, and on the earlier stage of these components. More specifically, when the application A 4 is in the binary format, a reverse proxy, having the IP address and a port set to the application A 4, may be installed in the region B 3. Thus, when the IP address and the port of the application A 4 are modified as appropriate, the client 1 may access the reverse proxy and the reverse proxy may access the application A 4 if required. In many cases, the IP address and the port are modifiable even when the application A 4 is in the binary format.

Next, the route inquiry unit 10 of the application B 4 receives a request reissued from the client 1 or forwarded from the application A 4, and executes processing similar to that in C5 to C7, and thus acquires the route information (C14). The inquiry in C5 and the inquiry in C14 are responded by the route information with the same content, as long as no failure occurs in C5 to C14. This is because the content of the end user request issued from the client 1 and the location of the client 1 are the only aspects, other than the condition of the region, affecting the route information transmitted as a response from the route resolution system 5.

Next, the route switching unit 11 passes the control to the application B 4, because the route information includes the address of the application B 4 including the route switching unit 11. Thus, the application B 4 processes the request (C15). The database 6 executes processing if required (C16).

Then, the processing result is transmitted to the client 1 as a response, and the client 1 receives the response (C17).

Next, the detail of the processing executed by the route resolution system 5 is described with reference to FIG. 4 to FIG. 7. FIG. 4 is a flowchart illustrating the processing executed by the route resolution system 5. The evaluation unit 12 of the route resolution system 5 receives the request as the end user request transmitted from the route inquiry unit 10, and refers to a table T1 with the end user request content in the request (F1).

The table T1 is managed by the end user trace management unit 13. The end user trace includes: requests transmitted between the client 1 and all the system components (the application A and B 4 and the database 6); and information that can be acquired by the end user trace collecting unit 16 by monitoring the communications and the processing related to the response. The end user trace information may be acquired by a known or a generally used method. For example, a method disclosed in "Dapper, a large-scale distributed systems tracing infrastructure." (Sigelman, Benjamin H., et al. 2010, Google research) may be employed.

Each row in the table T1 corresponds to a single end user trace collected by the end user trace collecting unit 16. The information acquired with the end user trace information, corresponding to each row in the table T1, is merely a preferred example for implementing the present embodiment, and thus should not be construed in a limiting sense.

The route resolution unit according to the present embodiment resolves the route optimal for the prioritized feature designated by the application provider and switches the route, based on the history of the actual end user request processing. This means that the route resolution is not performed unless there is a sufficient history of the actual end user request processing. When the route resolution is not performed, the application system is simply coupled through a conventional route. Thus, the collection and the management of the end user trace are described with an example of a conventional access route including the accessing the data in the database 6 in accordance with a request form the client 1, and executing the required processing by the application A 4. In this example, a single end user trace, transmitted by the end user trace collecting unit 16 of the client 1 to the end user trace management unit 13, includes the information related to the communications and the processing between the client and the application A 4, and is configured to store in the table T1 by the end user trace management unit 13.

Similarly, a single end user trace, transmitted by the end user trace collecting unit 13 in the region A 3 to the end user trace management unit 13, includes the communications and processing between the application A 4 and the database 6, and is configured to store in the table T1 by the end user trace management unit 13. The end user trace management unit 13 collectively manages all the end user traces derived from a single end user request as a single set of end user traces. The end user trace management unit 13 may use a table T3 to manage the set of end user traces, with the table 3 including each row corresponding to a single set of end user traces.

The table T1 includes: a trace ID indicating an identifier of each end user trace; a parent ID indicating an identifier of an end user trace as a parent in a parent-child relationship between end user traces; a brother ID indicating an end user trace in a brotherly relationship; a set ID indicating an identifier of a set of all end user traces derived from a single end user request; a source address indicating an address of the source of a processing request for the end user trace; a destination address indicating an address of a destination of the processing request for the end user trace; and response time, throughput and TAT each being performance information required for the end user trace processing.

The processing for a single end user trace may involve one or a plurality of requests. For example, when an end user accesses http://example.com/ by inputting this address in an address bar of client browser software, http://example.com/ is the only request (hereinafter, referred to as a main request) issued by the end user. However, the browser software automatically requests http://example.com/sample_image and the like (hereinafter, referred to as a sub request) to satisfy the request designated by the end user. Thus, in the present embodiment, all the communications and the processing for the request and its response corresponding to the same source address and the same destination address are collectively managed as a single end user trace. However, the method for management is not limited to this.

The response time indicates a period of time required for the first request in the end user trace to be processed. The TAT indicates a period of time required for all the requests in the end user trace to be processed. Data corresponding to trace IDs 1 and 2 in the table T1 is an example of data required for the connection among the client exemplified above (with xxx.xxx.xxx.xxx as the source address), the application A 4 (with yyy.yyy.yyy.yyy as the source address), and the database 6 (with zzz.zzz.zzz.zzz as the source address). The TAT of the trace ID 1 is longer than the TAT of the trace ID 2 is because the TAT of the trace ID 1 includes the TAT of the trace ID 2.

A single end user trace is configured to store in the table T1 may include all the end user traces with the same value of the source address, the destination dress, a request query, and additional information. The route resolution system 5 derives the optimal route by searching the table T1 based on the end user request content, and by using the service performance information obtained as a result of the searching. Thus, the end user trace collecting unit 16 needs not to directly manage a raw end user trace, collected by the end user trace collecting unit 16. Thus, the response time, the throughput, and the TAT in the table T1 are each a statistical value of end user traces collectively managed. The statistical value may be any value including an average value, a maximum/minimum value, and a median value. When the statistical value is used, moving average and the like reflecting the most recent situation may be employed. The table T1 further includes: a request query indicating a main request; and additional information indicating information added to the request query. An example of the additional information includes a Cookie when the end user trace is HTTP.

Next, when the result of F1 is void (F2), void route information is transmitted as a response to the request source (F9). When the result of F2 is not void, the result of F1 is checked against the table T3, and the end user trace set including the request as the end user request is acquired (F3). Then, the address of the system component, corresponding to the end user trace in the end user trace set acquired in F3, is acquired from the destination address or the source address (F4). Specification information on the system components is read from a table T6 managed by the component management unit 15 by using the information acquired in F4 (F5).

The table T6, managed by the component management unit 15, includes statistic information on the application system. The information in the table T6 is a merely an example indicating preferable minimum necessary information. The table T6 includes: a system component address that indicates an address for uniquely identifying the system component, and is an IP address of each system component in the present embodiment; and a location indicating location information on the regions A to C3. For instance, the location may be described with the longitude and the latitude. The network location information such as an IP address may be configured to store, and may be converted with a GeoIP database service (for example, Quova IP Geo-Location Database. <http://www.quova.com>).

The table T6 further includes: a component type indicating the type such as an application, a database, or the like; and an instance set indicating information on the performance specification of the computing resource including the system component. The instance set is not particularly limited as long as it is information representing the computing resource performance. The instance set according to the present embodiment indicates information representing the performance of each computing resource and the number of the computing resource. For example, a performance index of a central processing unit (CPU), a memory, or the like may be used. The performance index is set with the minimum instance, set in the current computing environment, defined as 1. This information is not an essential element but is preferably used for route calculation described later.

Next, the evaluation unit 12 derives a plurality of routes with which the end user request processing can be implemented (F6). To simplify the description, the present embodiment includes a small number of system components so that the route can be easily derived. Specific routes thus obtained include: a route in which the client 1 is coupled to the database 6 via the application A 4; a route in which the client 1 is coupled to the database 6 via the application B 4 due to the redirection; and a route in which the client 1 is coupled to the database 6 via the application B 4 and the application A 4. This all being said, it is to be noted that processing for a single end user request may generally involve a larger number of system components. In such a case, an existing search algorithm, examples of which include a graph search method such as a Dijkstra's algorithm or an A*search algorithm, may be used. Then, the evaluation unit 12 derives an estimated value of the service performance of a plurality of paths derived in F6 (F7). First of all, the evaluation unit 12 generates a table T2 from the table T1, by using the tables T4 to T6 managed by the infrastructure performance management unit 13.

The table T4 is managed by the infrastructure performance management unit 13 for managing a unit for evaluation for evaluating the performance of the network between the end user and a region, and between a plurality of regions. The table T4 includes: a network GID indicating an identifier of the unit of evaluation; and an address range indicating a range of addresses as the unit of the evaluation. The grouping is not particularly limited, but is preferably based on the system component type (the component type in the table T6) and the distance (the region in the present embodiment). For example, the table T4 manages four groups including: a GID 1 as a group including addresses of a plurality of end users in close locations; a GID 2 as a group of addresses of the system components, with the system component type indicating the application, in the region A 3; a GID 3 as a group of addresses of the system components, with the system component type indicating the application, in the region B 3; and a GID 4 as a group of addresses of the system components, with the system component type indicating the database, in the region B 3.

A table T5 is managed by the infrastructure performance management unit 13, and is configured to store therein results of actually evaluating the performance of the network of network groups in the table T4. Each row in the table T5 corresponds to information collected by the infrastructure performance collecting unit 17, transmitted to the infrastructure performance management unit 14, and is configured to store in the table T5 by the infrastructure performance management unit 14.

The table T5 includes: an ID as an identifier of each evaluation; and a network indicating a network as a performance measurement target. For example, the network corresponding to the ID 1 in the table T5 indicates the network performance between a network group 1 and a network group 2, that is, the network performance between the client 1 and the application A 4. The response time, the throughput, and the TAT each represents a performance measurement value of each network.

The performance information is configured to store in the table T5 may not be each performance information collected by the infrastructure performance collecting unit 17, and all the pieces of performance information corresponding to each network may be collectively managed as one performance information. The route resolution system 5 derives the optimal route by using the information in the table T5. Thus, raw performance information collected by the infrastructure performance collecting unit 17 needs not to be directly managed. Thus, the response time, the throughput, and the TAT in the table T5 are each a representative statistical value. The statistical value may be any value including an average value, a maximum/minimum value, and a median value. When the statistical value is used, moving average and the like reflecting the most current situation may be employed.

The table T2 includes the request query, the trace ID, the parent ID, the brother ID, the set ID, the source address, and the destination address that are the same as those in the table T1, and further includes a normalized response time, a normalized throughput, and a normalized TAT that are obtained by converting the response time, the throughput, and the TAT in the table T1 by using the tables T4 to T6.

The service performance in the table T1 depends on the network distance, the network performance, and the computing resource performance, and thus is normalized as described above to be independent from these aspects, so that the service performance in other routes can be derived. Although any normalization method may be employed, in the present embodiment, the service performance in the table T1 is divided by a corresponding network performance.

More specifically, the response time of the trace ID 1 in the table T1 is normalized by being divided by the response time of the trace ID 1 in the table T5 (15 ms/10 ms=1.5). In the present embodiment, the computing resource needs not and thus is not involved in the normalization because, as illustrated in the table T6, the computing resource performance is the same between the application A 4 and the application B 4, and only a single database 6 is used. The normalization may be typically performed as in the following (Formula 1), $$p\_i/(\alpha\_n*pn\_j+\alpha\_c*pc\_k), i=1,2,\ldots,n, j=1,2,\ldots,m, k=1,2,\ldots,s, \quad \text{(Formula 1)},$$

where p_i represents a service performance value in a row i in the table T1, pn_j represents the corresponding service performance in a row j in the table T5, pc_k represents a corresponding performance index in a row k in the table T6, α_n represents a coefficient of pn, and α_c represents a coefficient of pc. The coefficients may be of any suitable value. The table T2 may be derived in F7, or may be periodically generated in detail by the end user trace management unit 13 before the processing in FIG. 4 is executed.

Next, the evaluation unit 12 calculates an estimated value of the service performance for a plurality of routes derived in F6 by using the table T2. The values may be obtained by conversion through a reverse procedure with respect to the normalization procedure described above, by using a basic performance (the performance described in the table T5 and the table T6) of the network and the computing resource in each route. The method of calculating the estimated value is described in detail later.

A table VT1 illustrates an example of a result of deriving the estimated value of the service performance of the plurality of routes in F6 by the evaluation unit 12. Each row of the table VT1 represents each of plurality of route candidates described above. Columns of the table VT1 can be roughly divided into: a service performance between the client 1 and the application layer; a service performance between the application layer and the database layer; and an overall total service performance.

First of all, a method of calculating the estimated value of the service performance between the client and the application layer is described based on the VT1 as an example. The evaluation unit 12 refers to T3, and acquires the normalized performance information (standard value) in a row in a table T2 with matching request query, source address, and destination address. For example, the evaluation unit 12 acquires a 1.5 as the normalized response time from the T3 for the route of client (xxx.xxx.xxx.xxx)>application A (yyy.yyy.yyy.yyy)>database (zzz.zzz.zzz.zzz). For a route with the source address and the destination address matching none of the rows in T2, the evaluation unit 12 refers to T6, and selects the line with the matching types of components corresponding to the source address and the destination address. For example, the evaluation unit 12 acquires a 1.5 as the normalized response time from the table from T3 for the route of client (xxx.xxx.xxx.xxx)>application B (sss.sss.sss.sss)>database (zzz.zzz.zzz.zzz).

Next, the evaluation unit 12 refers to T5, and calculates the estimated value of the performance information based on the network performance. For example, the response time of 10 ms can be obtained from T5 for the network between the client and the application A in the route of client>application A>database. Thus, 1.5 (normalized response time)×10 ms=15 ms can be obtained as an estimated value of the response time between the client and the application A. The response time of 100 ms can be obtained from T5 for the network between the client and the application B in the route of client>application B>database. Thus, 1.5 (normalized response time)×100 ms=150 ms can be obtained as an estimated value of the response time between the client and the application B. In this route, the application A that has received a request from the client returns the request to the client (as the REDIRECT processing in FIG. 3), and thus 15 ms, as the estimated value of the response time between the client and the application A, is added. Thus, the estimated value of the response time between the client and the application is 150 ms+15 ms=165 ms.

Other types of performance information such as the throughput and the TAT are similarly calculated. The estimated value of the performance information on the application and the database is similarly calculated.

The table VT1 illustrates the following results. The route coupling between the client 1 and the database 6 via the application A 4 has the best response time. The route coupling between the client 1 and the database 6 via the application B 4 due to the redirection has the best throughput. The route coupling between the client 1 and the database 6 via the application A 4 and the application B 4 has the best TAT.

Next, the evaluation unit 12 selects the optimal route in terms of the prioritized feature designated by the application provider (F8). The application provider can activate/deactivate the route resolution system and set the prioritized feature of the route resolution system. FIG. 8 illustrates an example of a setting screen for the route resolution system. In FIG. 8, the TAT is set as the prioritized feature. Thus, in F8, the evaluation unit 12 selects a route with the shortest overall total TAT, that is, the route coupling between the client 1 and the database 6 via the application A 4 and the application B 4.

Next, the route resolution system 5 transmits the route information derived by the evaluation unit 12 in F8 as a response to the request source (F9). A box R1 in FIG. 7 illustrates an example of a format of the response. The box R1 illustrates an example where the route that couples between the client 1 and the database 6 via the application A 4 and the application B 4, selected in F8 for the inquiry from the route inquiry unit 10 in the application A 4, is described in a JSON format. The box R1 illustrates the route information including: all the addresses in the route, the location at the inquiry time point in the route, and the route switching method. The route preferably includes addresses and not domains. This is because a notification with the domain requires the name resolution using the DNS to be performed again for the notified domain, meaning that the route information is meaninglessly derived. Only a portion of the route after the inquiry time point may be described, instead of describing all the addresses in the route and the location at the inquiry time point in the route as in the box R1. The format of the route information as a response from the route resolution system 5 is not limited.

With the technique employed in the present embodiment, the application service can provide the optimal service performance, for the prioritized feature designated by the application provider, to the end user, in a distributed system.

EXAMPLE 2

A second embodiment of the present invention is described in detail with reference to the drawings. Throughout the figures, the same functions are denoted with the same reference numerals, and the redundant description thereof will be omitted.

In the example described in the first embodiment, the route is switched on a request destination side receiving the request from a request source. In an example described in the present embodiment, the request source switches the route based on information on the optimal route.

FIG. 9 is a diagram illustrating a configuration of a route resolution unit according to one embodiment of the present invention. An address rewriting unit 20 switches a route, based on the route information transmitted from the route resolution system 5 as a response to be received by the route inquiry unit 10.

FIG. 10 illustrates communications for resolving a route including optimal system components for the processing content requested by the client 1, and for controlling connections between system components.

The client 1 executes processing in C1 to C3 to perform name resolution, executes processing in C5 to C7 to perform route resolution, and changes a connection destination based on the route information obtained in C7. In the box R1, the connection with the application B 4 with an address sss.sss.sss.sss is established instead of the application A 4 with the address yyy.yyy.yyy.yyy obtained by the DNS.

The address rewriting unit 20 is only in charge of rewriting the connection destination by referring to the route information received by the route inquiry unit 10. One example of a method of easily implementing the address rewriting unit 20 is described, based on a fact that it is cumbersome to correct all code portions including the description on the connection destination of the application. Specifically, the method includes: preparing the address rewriting unit 20 as a library; hooking API calls in the library of a network between the client 1 and all the system components; and rewriting the original address with the address of the connection destination obtained by the route information.

With the technique employed in the present embodiment, the application service can provide the optimal service performance, for the prioritized feature designated by the application provider, to the end user, in a distributed system.

EXAMPLE 3

A third embodiment of the present invention is described in detail with reference to the drawings. Throughout the figures, the same functions are denoted with the same reference numerals, and the redundant description thereof will be omitted.

In the first embodiment, the route resolution inquiry is issued to the route resolution system for the route resolution, every time a request is delivered to a system component. The route resolution system derives the optimal route every time the request is delivered. An object of the present embodiment is to make these processes more efficient.

FIG. 11 is a diagram illustrating a configuration of a route resolution unit according to one embodiment of the present invention. A route informing unit 30 adds route information to a communication content transmitted to the client 1 or another system component, when the route switching unit 11 switches a route by redirecting or forwarding the route information received by the route inquiry unit 10. The route informing unit 30 checks the route information from the communication content, when the system component receives a request. A resolution history management unit 31 is configured to store resolved route information for a predetermined period of time, so that route information obtained in the past can be provided to the evaluation unit 12.

FIG. 12 is a flowchart illustrating processing executed by the route informing unit 30, the route inquiry unit 10, and the route switching unit 11. The route informing unit 30 checks whether the received request includes route information (F11). When the route information is included, the route informing unit 30 does not request the route inquiry unit 10 for the inquiry, and uses the route information transmitted thereto (F13). When the route information is not included, the route informing unit 30 requests the route inquiry unit 10 for the inquiry (F12). The inquiry method performed by the route inquiry unit 10 is as described in the first embodiment. The route switching may be performed as in the first embodiment, after the route information has been acquired (F14).

When the present embodiment is implemented with the route switching unit 11 selecting the redirection, the redirected connection source generates a request again. Thus, when the HTTP is employed, preferably, the route information is written in Cookie, and then the redirection is performed.

FIG. 13 illustrates a table managed by the resolution history management unit 31, and a flow of route resolution processing executed by the route resolution system 5 including the resolution history management unit 31.

After the processing in F8 in FIG. 4, the evaluation unit 12 passes the request content, the route information, and information on the expired dates of these to the resolution history management unit 31. The resolution history management unit 31 is configured to store the information as in a table T10 in FIG. 13. The resolution history management unit 31 checks the expired date periodically or on an event driven basis, and deletes the expired history.

The evaluation unit 12 inquires with the resolution history management unit 31 with the request content (F21) before the processing in the flowchart in FIG. 4 is executed. The resolution history management unit 31 extracts the item corresponding to the request content from request query column in the table T10, and transmits the result as a response to the evaluation unit 12. When the result is void (F22), the evaluation unit 12 executes the processing in F1 to F8 in FIG. 4. When the result is not void, the processing in F9 is executed with the information.

The present embodiment, which is described as the extended version of the first embodiment, may be performed in combination with the method described in the second embodiment. With the technique employed in the present embodiment, high speed route resolution can be achieved in a distributed system.

REFERENCE SIGNS LIST

5 Route resolution system
10 Route inquiry unit
11 Route switching unit
12 Evaluation unit
13 End user trace management unit
14 Infrastructure performance management unit
15 Component management unit
20 Address rewriting unit
30 Route informing unit
31 Resolution history management unit

The invention claimed is:

1. A route resolution system, for improving performance of a computer network, the route resolution system comprising:
   a communication interface that is communicatively coupled to a plurality of components that comprise the computer network, wherein the plurality of components includes a client terminal;
   a memory;
   an input/output device;
   a processor communicatively coupled to the communication interface, memory and the input/output device,
   wherein the processor is configured to:
   manage configuration information including addresses and types of the plurality of components;
   manage network performance information including a measured value of performance information on the network of the plurality of components;
   manage processing performance information including a total value of the measured value of the performance information between the plurality of components required for processing at least one request from the client terminal;
   convert, based on the configuration information, the network performance information, and the processing performance information, the measured value of the processing performance information into a standard value that is normalized with respect to the network performance information, derive, upon receiving a route inquiry request from a particular component to which the at least one request has been forwarded, a plurality of routes being coupled to the plurality of the components for processing the at least one request, based on the configuration information, identifies the standard value obtained for the at least one request in combination of adjacent components in the plurality of routes, wherein the adjacent components are of a same type as the particular component calculate an estimated value of performance information required for processing the at least one request, for each of the plurality of routes, based on the standard value identified and the network performance information, and determines an optimal route based on the estimated value calculated.

2. The system according to claim 1, wherein the processor is further configured to:

select a respective component out of the plurality of components, inquire with the route resolution system about a respective route for processing the at least one request, determine, upon receiving the optimal route from route system, whether the respective component is included in the optimal route determined, process the at least one request when the respective component is included, and forward the at least one request to a non-selected component in the optimal route or to the client terminal when the non-selected component is not included.

3. The system according to claim 2, wherein the processor adds the optimal route to the request to be forwarded.

4. The system according to claim 1, wherein the client terminal:

inquires with the route resolution system via the network of the plurality of components about a route for processing the at least one request; and determines, upon receiving the optimal route from the route system, a forwarding destination of the at least one request based on the optimal route.

5. A route resolution method for improving performance of a computer network, the route resolution method comprising:

managing, by a processor, configuration information including addresses and types of a plurality of components in the computer network;

managing, by the processor, network performance information including a measured value of performance information on a network of the plurality of components;

managing, by the processor, processing performance information including a total value of the measured value of the performance information between the plurality of components required for processing at least one request from a client terminal as one of the plurality of components;

converting, by the processor, based on the configuration information, the network performance information, and the processing performance information, the measured value of the processing performance information into a standard value that is normalized with respect to the network performance information;

deriving, by the processor, upon receiving a route inquiry request from a particular component to which the at least one request has been forwarded, a plurality of routes being coupled the plurality of the components for processing the at least one request, based on the configuration information;

identifying, by the processor, the standard value obtained for the at least one request in combination of adjacent components in the plurality of routes, wherein the adjacent components are of a same type as the particular component;

calculating, by the processor, an estimated value of performance information required for processing the at least one request, for each of the plurality of routes, based on the standard value identified and the network performance information; and determining, by the processor, an optimal route based on the calculated estimated value.

6. The route resolution method according to claim 5 further comprising:

selecting, by the processor, a component from the plurality of components, receiving, by the processor, inquiry about a route for processing the at least one request;

determining, by the processor, upon receiving the optimal route determined, whether the component selected is included in the optimal route, processing, by the processor, the at least one request when the component selected is included, and forwarding, by the processor, the at least one request to a non-selected component in the optimal route or to the client terminal when a non-selected components is not included.

7. The route resolution method according to claim 6 further comprising:

adding, by the processor, the optimal route to the at least one request and forwarding the at least one request, by each the plurality of components.

8. The route resolution method according to claim 5 further comprising:

inquiring, by a client terminal, with the route resolution system about a route for processing the at least one request; and determining, by the client terminal, upon receiving the optimal route from the route system, a forwarding destination of the at least one request based on the optimal route determined.

* * * * *